United States Patent
Abrudan et al.

(10) Patent No.: US 9,366,296 B2
(45) Date of Patent: Jun. 14, 2016

(54) SWAGING FEATURES THAT LOCK RETAINING ELEMENTS FOR BEARINGS

(71) Applicant: THE BOEING COMPANY, CHICAGO, IL (US)

(72) Inventors: Adrian Silviu Abrudan, Lynnwood, WA (US); Christopher E Plass, Monroe, WA (US); Morri Montazeri, Mukliteo, WA (US); Stephen Alden Skinner, Seattle, WA (US)

(73) Assignee: The Boeing Company, Chicago, IL (US)

( * ) Notice: Subject to any disclaimer, the term of this patent is extended or adjusted under 35 U.S.C. 154(b) by 69 days.

(21) Appl. No.: 14/154,032

(22) Filed: Jan. 13, 2014

(65) Prior Publication Data

US 2015/0198204 A1 Jul. 16, 2015

(51) Int. Cl.
*F16C 23/08* (2006.01)
*F16C 43/02* (2006.01)
*B23P 15/00* (2006.01)
(Continued)

(52) U.S. Cl.
CPC .............. *F16C 43/02* (2013.01); *B23P 15/003* (2013.01); *F16C 23/045* (2013.01); *F16C 23/084* (2013.01); *F16C 35/02* (2013.01); *F16C 11/0614* (2013.01); *F16C 11/0695* (2013.01); *F16C 33/586* (2013.01); *F16C 2226/52* (2013.01); *F16C 2226/60* (2013.01); *Y10T 29/49652* (2015.01); *Y10T 29/49679* (2015.01); *Y10T 29/49963* (2015.01)

(58) Field of Classification Search
CPC .... F16C 11/0614; F16C 17/10; F16C 23/045; F16C 23/082; F16C 33/583; F16C 2226/60; Y10T 29/49652; Y10T 29/49963

USPC ......... 384/203, 205–206, 208–211, 217, 295; 29/898.045, 898.044, 898.051, 29/898.043, 898.09, 898.06

See application file for complete search history.

(56) References Cited

U.S. PATENT DOCUMENTS 2,906,568 A * 9/1959 Gray ............................. 384/210
3,444,606 A * 5/1969 Jones ....................... 29/243.517
(Continued)

FOREIGN PATENT DOCUMENTS

JP 2001193735 A * 7/2001 .............. F16C 25/04
WO WO 2009002843 A1 * 12/2008 ............ F16C 35/077

OTHER PUBLICATIONS

AME.com, "SPIETH Precision Locknut Series MSF", Dec. 11, 2013, www.ame.com/products/components/spiethprecisionlocknuts/locknut-msf/.
(Continued)

*Primary Examiner* — Marcus Charles
(74) *Attorney, Agent, or Firm* — Duft Bornsen & Fettig LLP (57) ABSTRACT

Apparatus and methods are provided for locking retaining elements in place. One embodiment is a bearing having an outer race. The race has a first end and a second end. The race includes a flange on the first end that is able to mate with a housing, and the race also includes an annular threaded portion on the second end. The threaded portion receives an annular threaded retaining element that mates with the housing. The race additionally includes an annular protrusion on the second end, concentric with the threaded portion, that is able to be swaged, thereby increasing a diameter of the protrusion to overlap the threaded portion.

20 Claims, 13 Drawing Sheets

(51) Int. Cl.
*F16C 35/02* (2006.01)
*F16C 23/04* (2006.01)
*F16C 11/06* (2006.01)
*F16C 33/58* (2006.01)

(56) References Cited

U.S. PATENT DOCUMENTS

| | | | |
|---|---|---|---|
| 3,516,136 A | | 6/1970 | Carter et al. |
| 3,662,462 A | * | 5/1972 | Shiflet .................. 29/898.045 |
| 3,989,322 A | * | 11/1976 | McCloskey .................. 384/212 |
| 4,055,369 A | * | 10/1977 | Lynn et al. .................. 384/477 |
| 4,076,343 A | * | 2/1978 | McCloskey .................. 384/210 |
| 4,089,095 A | * | 5/1978 | Becker .................. 29/898.044 |
| 4,116,504 A | * | 9/1978 | Cass .................. 384/210 |
| 4,243,192 A | * | 1/1981 | Johnson .................. 244/215 |
| 4,251,122 A | * | 2/1981 | McCloskey .................. 384/192 |
| 4,844,627 A | | 7/1989 | Speakman |
| 5,087,131 A | * | 2/1992 | D'Andrea .................. 384/208 |
| 5,463,811 A | * | 11/1995 | Aureli et al. .................. 29/898.046 |
| 6,382,865 B1 | * | 5/2002 | Paxman .................. 403/131 |
| 6,612,744 B2 | * | 9/2003 | Sasaki et al. .................. 384/208 |
| 2003/0095729 A1 | * | 5/2003 | Post et al. .................. 384/213 |
| 2008/0040886 A1 | * | 2/2008 | Arnold et al. .................. 384/322 |

OTHER PUBLICATIONS

SKF, "SKF lock nuts", 1999, Publication 4412/I E, online at http://www.kge.bme.hu/hun/KMT.pdf.

Taper Line, "Taper Line, Inc. Locknuts Product Guide", Dec. 11, 2013, www.taperline.com/locknuts-product-guide.html.

"Untitled", Subaru Outback Forums, online at http://www.subaruoutback.org/forums/99-do-yourself-illustrated-guides/46552-05-09-replacing-rear-wheel-bearing-3.html#post441789, 2007 Vertical Scope, Inc.

"Untitled", http://simplybearings.co.uk/shop/advanced_search_result.php?keywords=kmt, © Copyright 2004-2015 Simply Bearings Ltd.

PSI Aerospace Bearings, "P2A6700 Series Pre-Swaged, Captor", © 2015 Rexnord AR9-003 www.aerospace.rexnord.com.

* cited by examiner

SWAGING FEATURES THAT LOCK RETAINING ELEMENTS FOR BEARINGS

FIELD

The disclosure relates to the field of mechanical engineering, and in particular, to bearings.

BACKGROUND

Aircraft utilize a variety of systems to adjust how air flows over a wing. For example, an aircraft may change the position of one or more flaps on the wing in order to adjust flight dynamics. The flaps themselves may be driven along tracks that are mounted to the wing. Many tracks utilize bearings at joints that connect the track to the wing. The bearings ensure that the tracks do not unduly apply torque or other stresses to the wing, even if there is a misalignment in the tracks. However, the bearings for tracks of aircraft wings operate under substantial load, and are also subject to high vibration. Because of these load characteristics, it is not uncommon for a bearing to rotate or even migrate within its housing over time. Thus, after a period of use, the bearing may be in need of replacement.

Existing solutions to hold a bearing in place utilize retainer nuts that are threaded onto a race of the bearing to hold the bearing within its housing. However, threaded retainer nuts themselves are subject to loosening over time. To address this issue, nylon pellets (or other friction devices) may be used within the threading for a retainer nut to hold the retainer nut in place. However, the nylon pellets themselves are subject to wear due to the high levels of vibration in aircraft. This means that the nylon pellets degrade over time, which in turn means that the retainer nut loosens and the bearing migrates as flight hours accumulate on the aircraft. The maintenance and replacement of the bearings therefore undesirably increases the expense of maintaining the aircraft, particularly because many days of labor may be required to access the bearings of the tracks.

For at least these reasons, users of bearings continue to desire mechanical systems that effectively retain a bearing within its housing, even after sustained periods of use at high load or vibration.

SUMMARY

Embodiments described herein utilize swagable protrusions on a race of a bearing. The protrusions may be swaged onto a retaining element, such as a retainer nut, in order to fixedly attach the retaining element to the race. Because the swaged protrusion locks the retaining element to the bearing, the retaining element is not subject to loosening over time. This in turn increases the operational lifetime of the bearing.

One embodiment is an apparatus that includes a bearing having a swagable race. The bearing includes an outer race. The race has a first end and a second end. The race also includes a flange on the first end that is able to mate with a housing for the bearing, and the race further includes an annular threaded portion on the second end. The annular threaded portion is able to receive an annular threaded retaining element that mates with the housing. Furthermore, the race includes an annular protrusion on the second end, concentric with the threaded portion, that is able to be swaged, thereby increasing a diameter of the protrusion to overlap the threaded portion.

Another embodiment is an apparatus that includes a race that has been swaged. The bearing includes an outer race that has a first end and a second end. The bearing also includes an annular threaded retaining element mated with a housing for the bearing. The race includes a flange on the first end that is mated with the housing for the bearing. The race also includes an annular threaded portion on the second end. The annular threaded portion has received the retaining element. Additionally, the race includes an annular protrusion on the second end, concentric with the threaded portion, that is swaged, where a diameter of the protrusion overlaps the threaded portion.

Another embodiment is a method. The method includes inserting a bearing, including an outer race, into a housing. The method further includes threading a retaining element onto the race of the bearing, wherein the retaining element is adapted to mate with the housing. The method also includes swaging an annular protrusion of the race onto the retaining element, thereby fixedly attaching the retaining element to the bearing.

Other exemplary embodiments may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
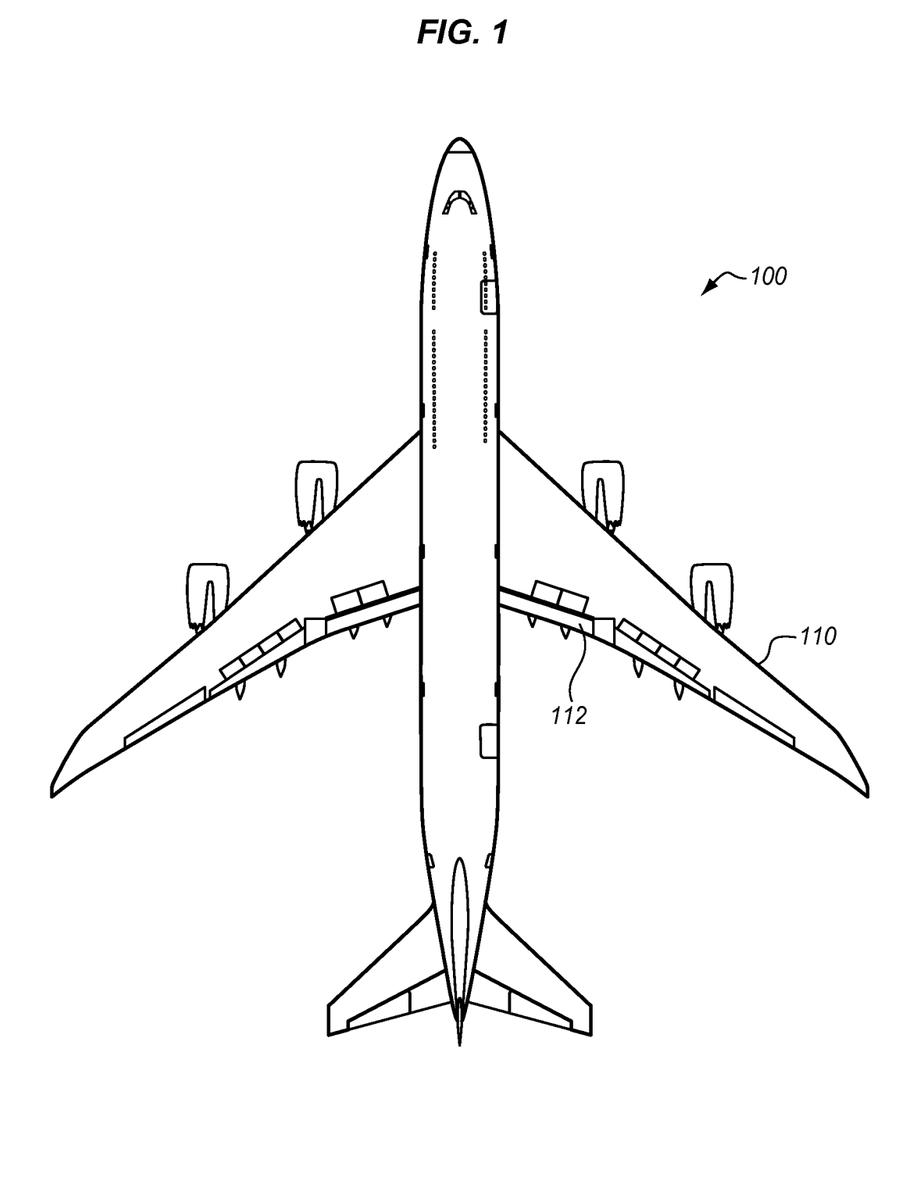
FIG. 1 is a diagram illustrating an aircraft in an exemplary embodiment.
Figure 2:
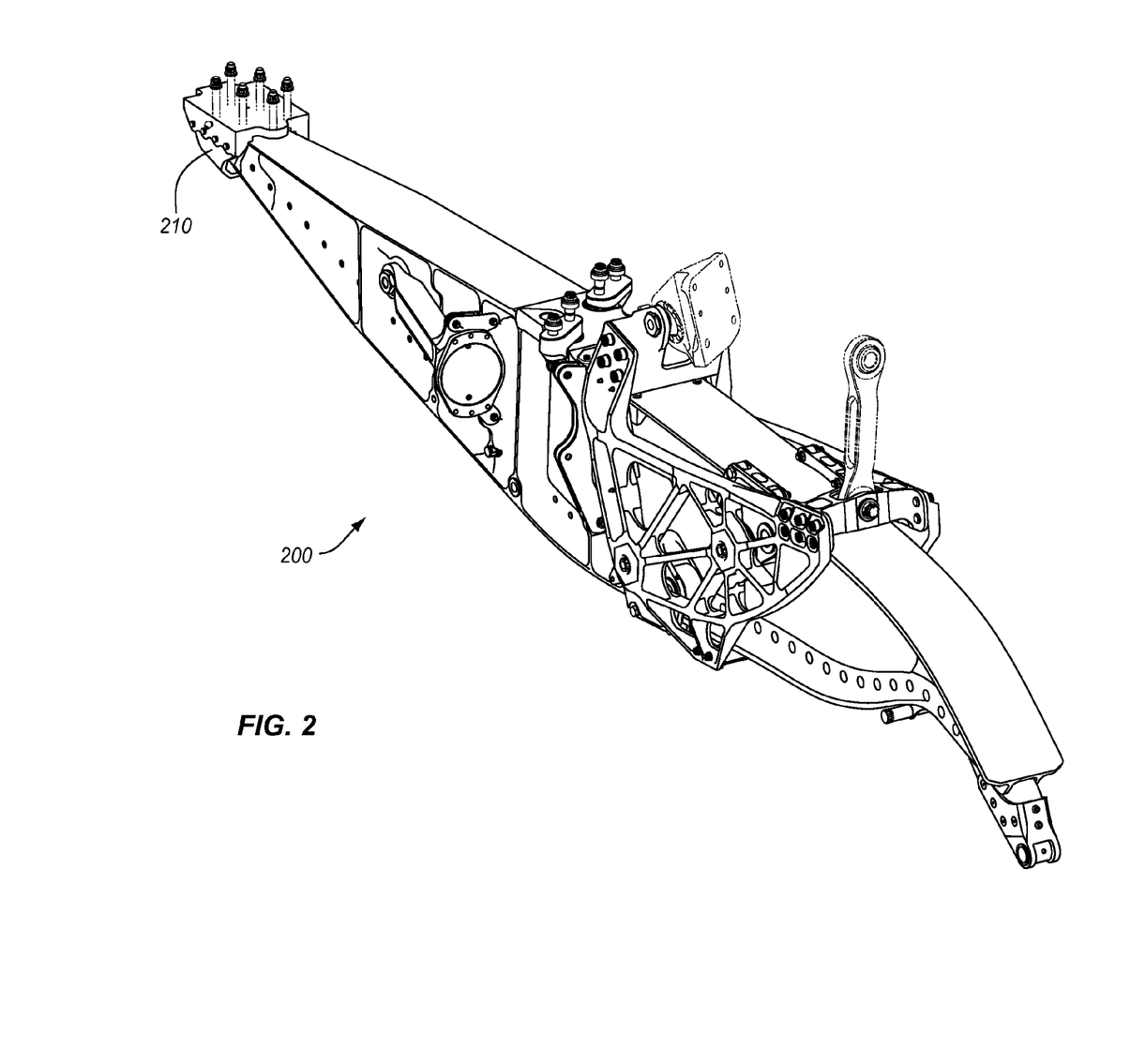
FIG. 2 is a diagram illustrating a track for an aircraft in an exemplary embodiment.
Figure 3:
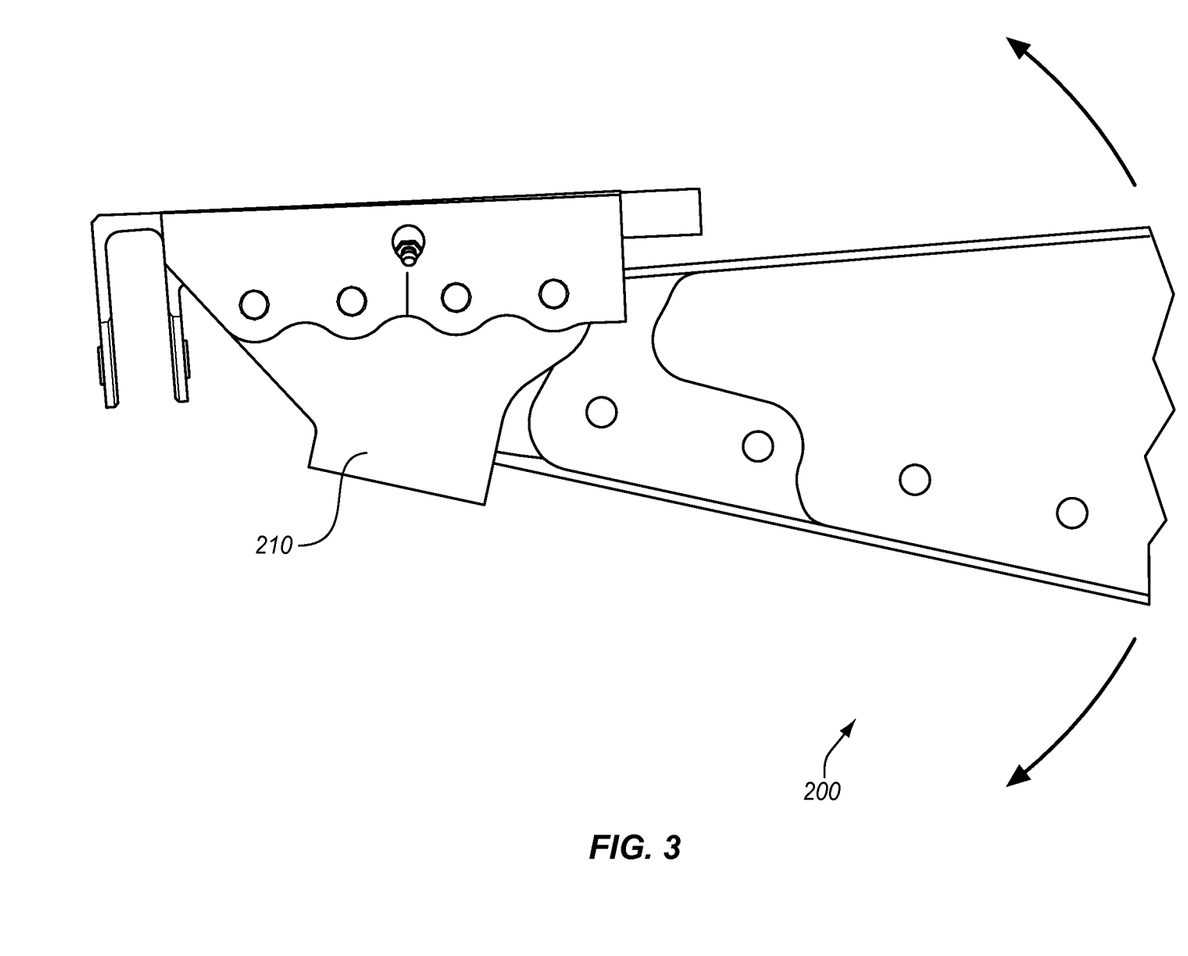
FIG. 3 is a diagram illustrating a side view of a forward fitting assembly of a track for an aircraft in an exemplary embodiment.

FIGS. 1-5 generally illustrate an exemplary system in which an enhanced bearing may be used. FIG. 1 is a diagram of aircraft 100 in an exemplary embodiment. Aircraft 100 (e.g., a Boeing 747-8 series aircraft) includes wing 110, onto which one or more flaps 112 are movably attached. FIG. 2 illustrates track 200, which supports flaps 112 and programs flap position and kinematic motion. Track 200 may be referred to as a "flap track." Track 200 is attached to wing 110 via one or more fittings, such as forward fitting assembly 210. Forward fitting assembly 210 may experience forces during flight as wing 110 flexes, particularly if there is any form of misalignment in how track 200 is installed onto wing 110. To prevent these forces from transferring to wing 110 (which may unduly stress wing 110), forward fitting assembly 210 includes a bearing that allows components of track 200 to deflect/rotate as forces are applied to track 200. FIG. 3 is a diagram illustrating a side view of deflection with respect to forward fitting assembly 210 in an exemplary embodiment. In FIG. 3, the arrows indicate exemplary directions along which components of track 200 may deflect with respect to forward fitting assembly 210.

Figure 4:
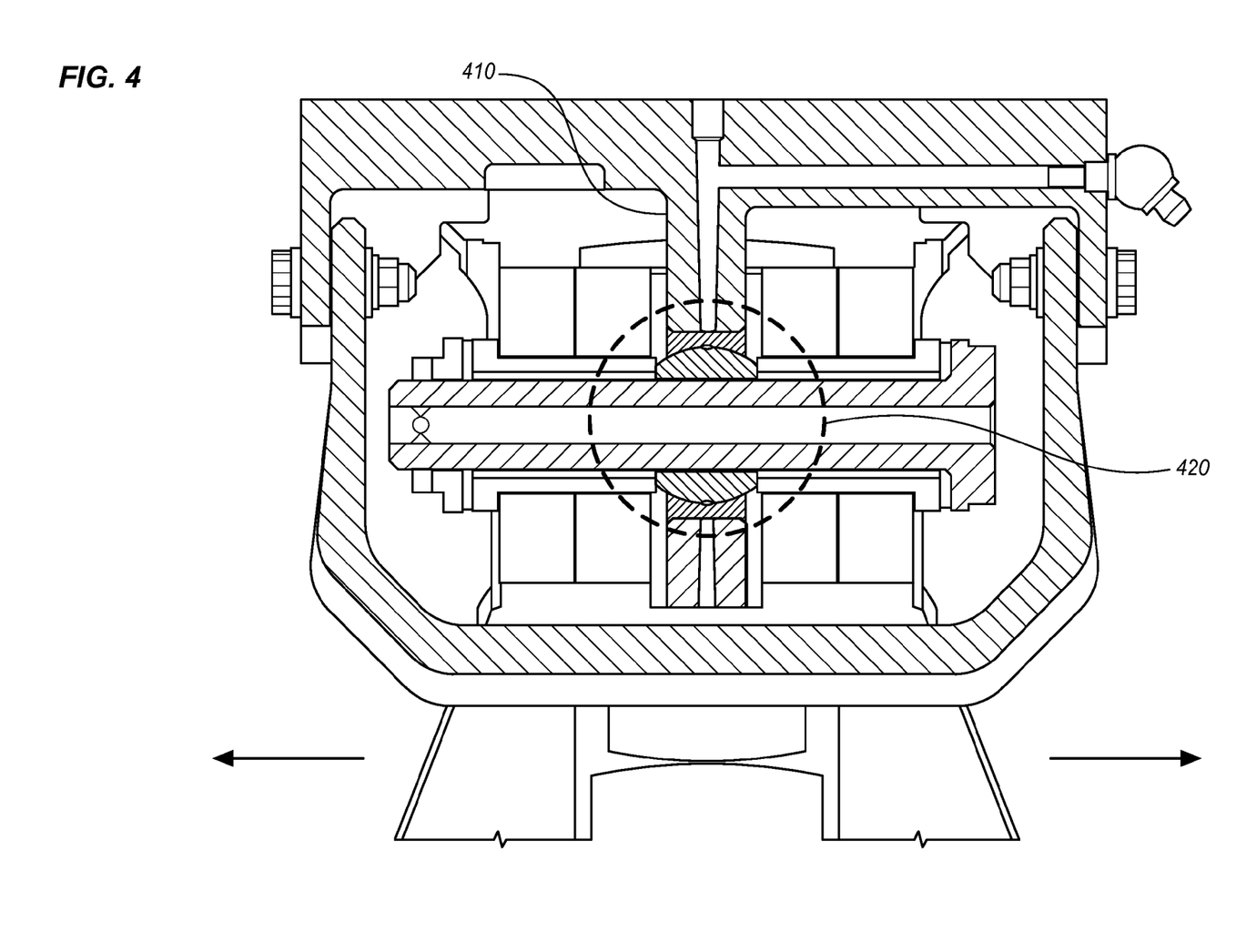
FIG. 4 is a diagram illustrating a cut-away front view through a forward fitting assembly of a track showing the housing and bearing together with the attaching bolt for an aircraft in an exemplary embodiment.
Figure 5:
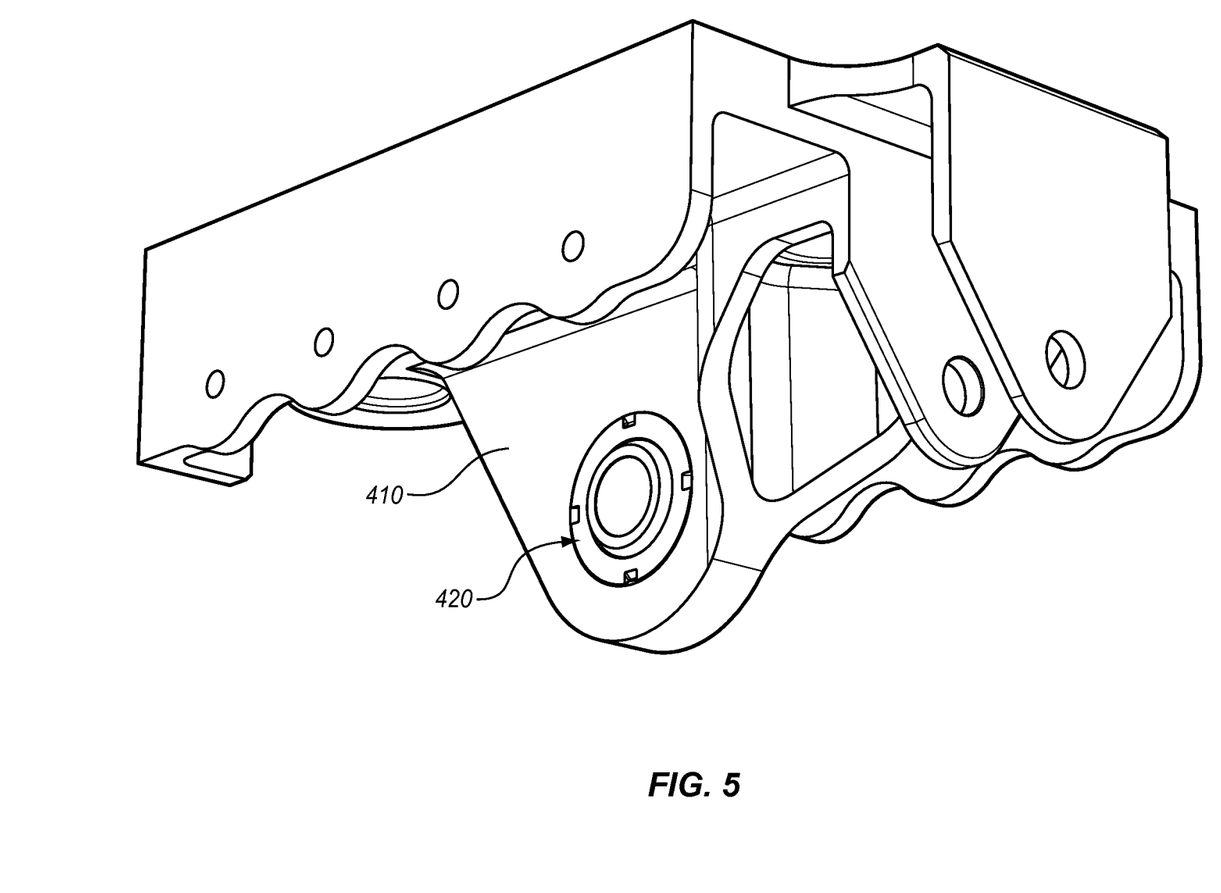
FIG. 5 is a perspective view of a housing of a forward fitting assembly together with a retained bearing in an exemplary embodiment.

FIG. 4 is a diagram illustrating a cut-away front view through the forward fitting assembly 210 showing the housing and bearing together with the attaching bolt in an exemplary embodiment. FIG. 4 shows that forward fitting assembly 210 includes housing 410, and bearing 420. Bearing 420 allows components of track 200 to misalign without transferring the resulting load to wing 110 of aircraft 100. For example, in FIG. 4, the arrows indicate additional exemplary directions along which components of track 200 may deflect with respect to forward fitting assembly 210. FIG. 5 further illustrates both housing 410 and bearing 420.

Because flight operations may impart both heavy load and high vibration to bearing 420, it is desirable to mount bearing 420 into housing 410 in a manner that ensures bearing 420 will not unexpectedly rotate or migrate with respect to housing 410. Bearing 420 has been enhanced with swaging features that ensure that retaining elements used to hold bearing 420 in position (e.g., retainer nuts, jam nuts, washers, retainer clips, etc.) will not move under load.

Figure 6:
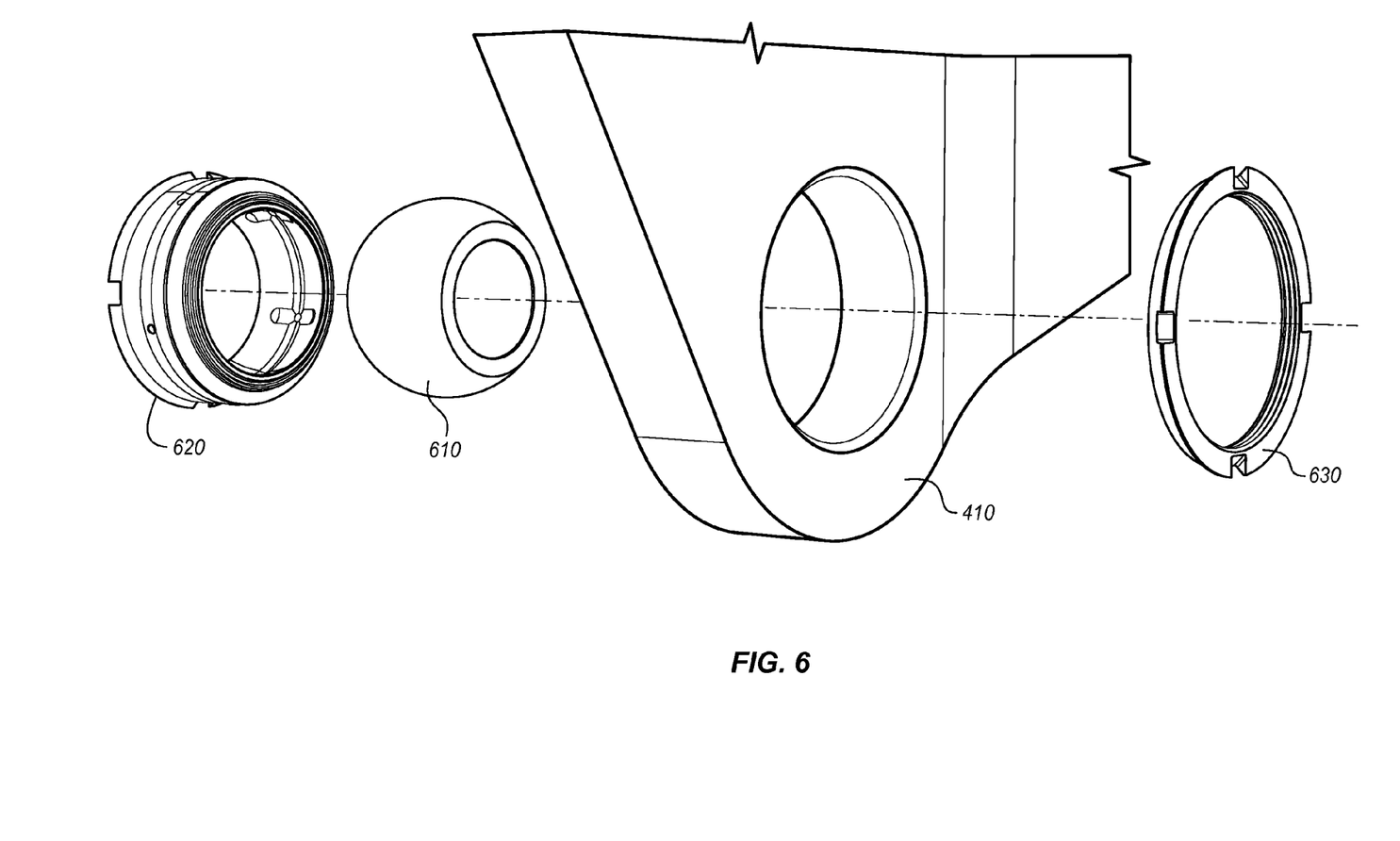
FIG. 6 is an exploded perspective view of a bearing and a housing in an exemplary embodiment.

FIG. 6 is an exploded perspective view of bearing 420 and housing 410 in an exemplary embodiment. FIG. 6 illustrates that bearing 420 comprises what is commonly referred to as a spherical bearing. Spherical bearings are a family of bearings that incorporate a ball with a substantially spherical outer diameter. Spherical bearings may be sliding surface bearings or rolling-element bearings (e.g., bearings that utilize tapered rolling elements). The inner diameter of a ball of a spherical bearing is typically cylindrical. In spherical bearings that utilize one-piece balls, the outer race of the bearing is typically formed around the ball. For multiple-piece balls, the outer race is typically machined and the bearing may be assembled and separated as desired.

Bearing 420 includes spherical ball 610 and race 620, which retains spherical ball 610. As used herein, the term "spherical ball" is used to refer to ball 610, even though ball 610 includes a cylindrically hollow passage/cylindrical cavity, because the phrase "spherical ball" is widely appreciated by those familiar with bearings to refer to components that are similar in shape and function to ball 610. Ball 610 may, for example, be constructed as one piece or multiple pieces. When bearing 420 is inserted/slid into housing 410 from the left, retainer nut 630 is threaded onto race 620 and torque is applied in order to ensure that bearing 420 is not slid/driven back out of housing 410.

Figure 7:
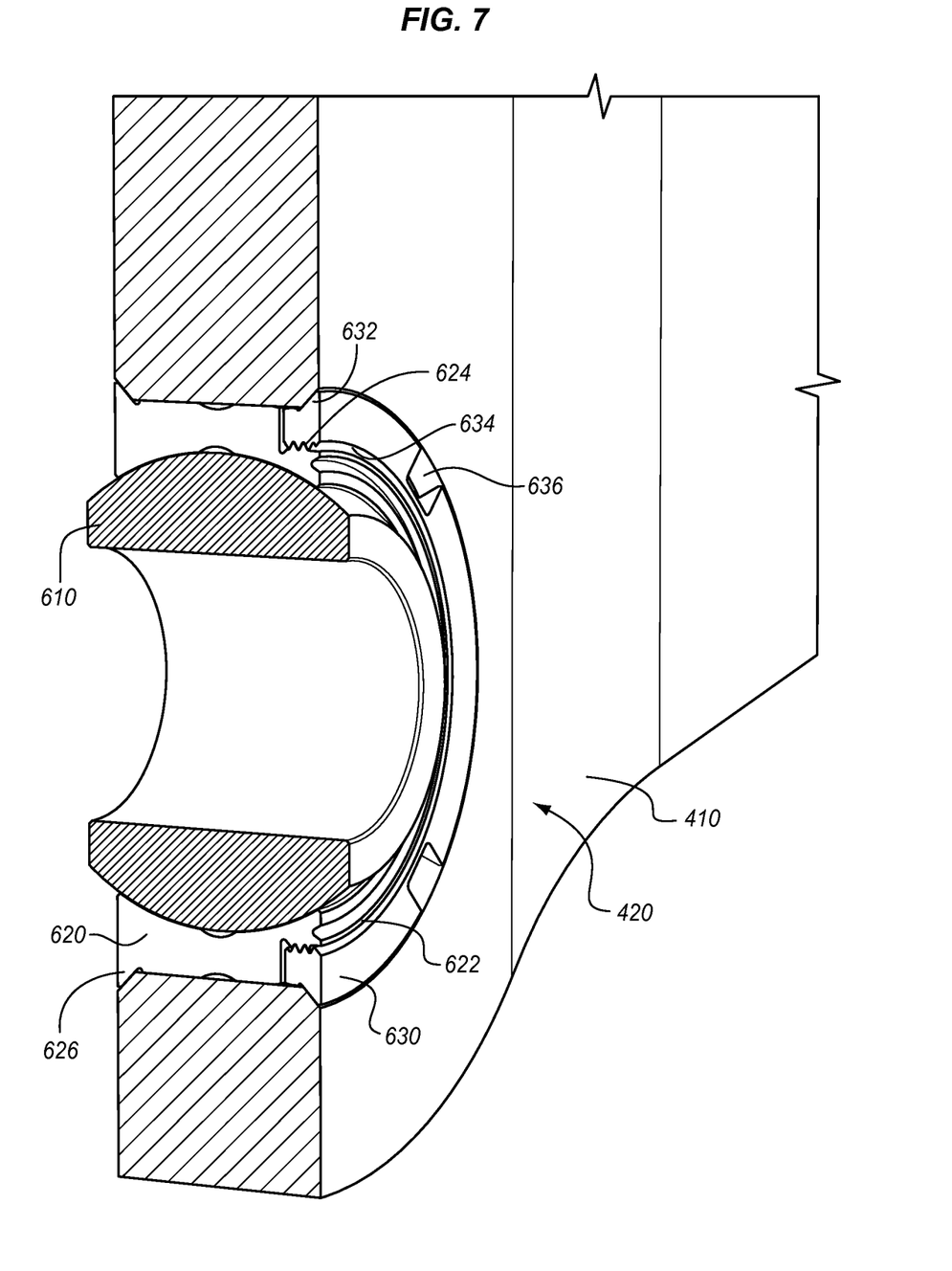
FIGS. 7-9 illustrate views of a bearing with a race that includes a swagable annular protrusion in an exemplary embodiment.
Figure 8:
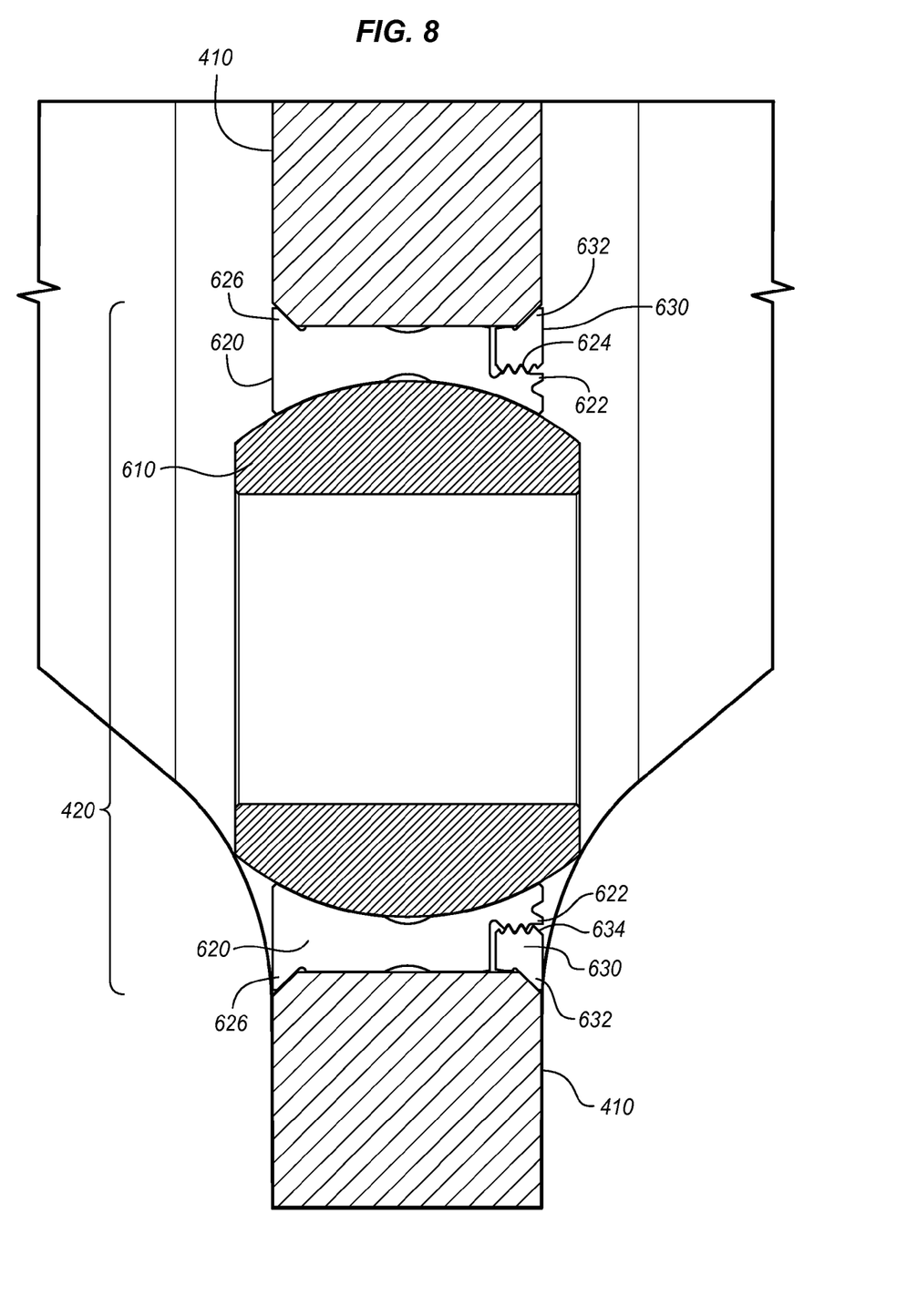
Figure 9:
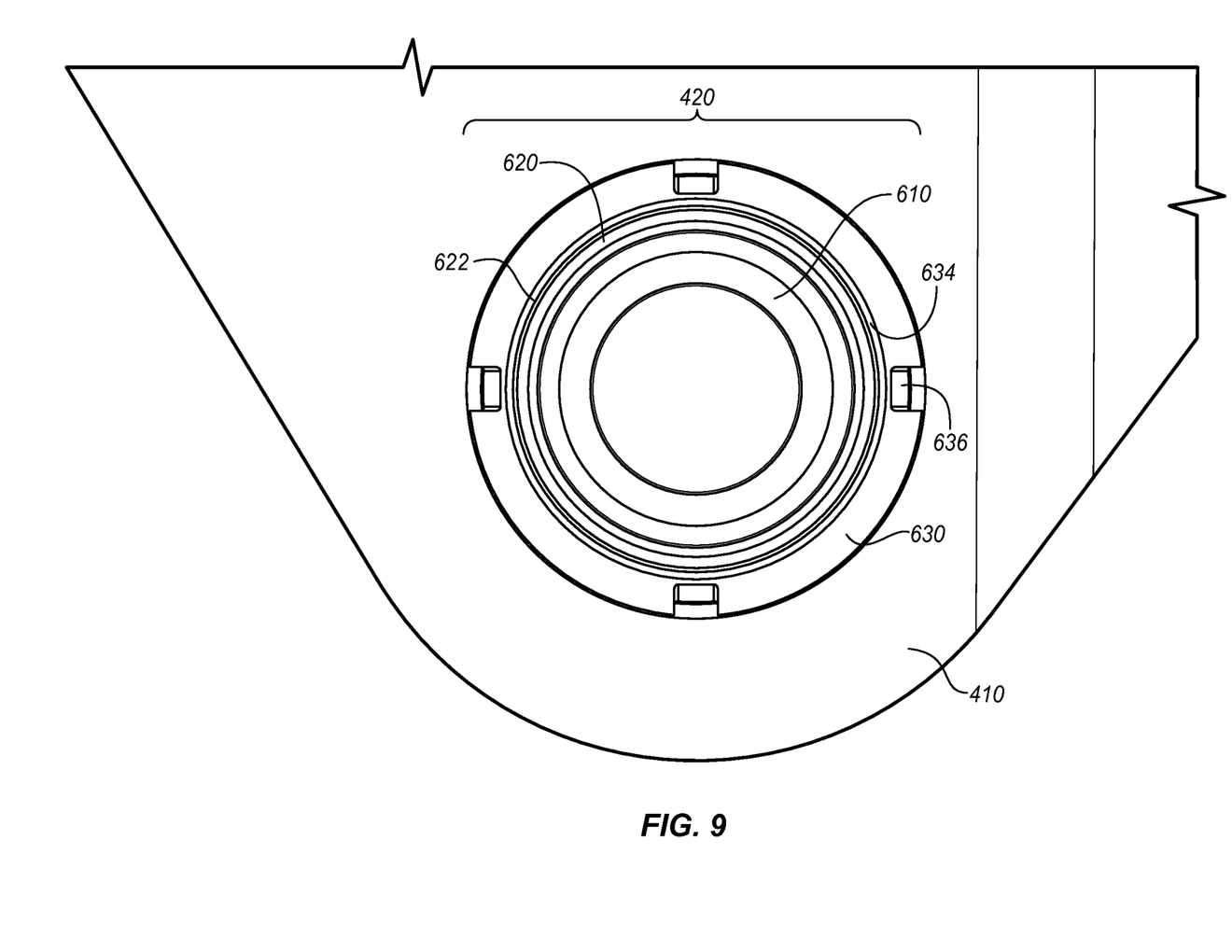

FIGS. 7-9 illustrate views of a bearing with a race that includes a swagable annular protrusion in an exemplary embodiment. FIG. 7 illustrates a perspective cut-away view, while FIG. 8 illustrates a side cut-away view and FIG. 9 illustrates a front view. According to FIG. 7, bearing 420 includes ball 610, which moves within race 620. Race 620 defines a circular opening on each of its ends (i.e., race 620 includes a cylindrical passage), through which an axial rod may be inserted through ball 610. When mounted in housing 410, race 620 resists axial loads applied by such an axial rod to ball 610.

Race 620 includes mating feature 626 (e.g., a circumferential flange defined by a chamfer or bevel, a series of radial flanges, square lip, etc.) which mates with a corresponding feature on housing 410, preventing race 620 from exiting housing 410 when race 620 is pushed towards the right within housing 410. However, race 620 does not include a similar feature on the opposite side, which means that race 620 may be inserted/slid into housing 410. To secure race 620 (and therefore bearing 420) on the right hand side, retainer nut 630 is threaded onto annular threaded portion 624 of race 620. Retainer nut 630 includes a locking feature 632 (e.g., a chamfer, bevel, square lip, etc.) that mates with a corresponding feature of housing 410, resisting forces that are applied when bearing 420 is pushed towards the left within housing 410. Retainer nut 630 also includes tool features 636 (e.g., slots, lugs, holes, etc.) to accept torque from an installation tool (e.g., a special wrench) while being installed/threaded onto race 620.

Race 620 also includes an annular protrusion 622 (e.g., a ridge, lip, etc.) that is concentric with annular threaded portion 624. Annular protrusion 622 may be swaged to overlap/cover/deflect/flare out onto circumferential feature 634 (e.g., a chamfer, bevel, etc.) of retainer nut 630. This means that once annular protrusion 622 has been swaged, retainer nut 630 becomes fixedly attached to race 620, and therefore to housing 410 Annular protrusion 622 may comprise any suitable protrusion capable of being swaged onto retainer nut 630. As such, it may be desirable for annular protrusion 622 to be made from a material having sufficient ductility (e.g., capable of withstanding approximately 11% or more elongation) and also strength (e.g., an alloy of aluminum, steel or bronze, etc.) to withstand the swaging process.

In one embodiment, annular protrusion 622 may comprise a machined "V-groove" on race 620, annular protrusion 622 may comprise a cast ridge or lip on race 620, or annular protrusion 622 may comprise a 3D-printed feature on race 620. The race 620 and annular protrusion 622 may be swaged over retainer nut 630 using any desired swaging tooling as a matter of design choice. For example, when annular protrusion 622 comprises a V-groove, an outer wall of the V-groove may be swaged outward.

In a further embodiment, annular protrusion 622 may comprise a series of concentric swagable arcs that are separated by gaps. The swagable arcs, together with the gaps, form an annulus, similar in nature to a ring defined by a dashed line. For example, in this embodiment protrusion 622 may comprise a series of semi-circumferential (e.g., interrupted) swaging grooves. Such a protrusion 622 may still be effectively swaged with a single application of a swaging tool, because the swagable arcs share a common center point and radius.

Any suitable form of swaging may be used to deform protrusion 622. For example, any of a Roller Swage, Anvil Swage, Ball Stake or Line Stake may be applied in order to accomplish permanent deformation of protrusion 622 into circumferential feature 634 (e.g., a circumferential lip). Roller swaging utilizes a rotating series of rollers to apply pressure to protrusion 622, and may be used to ensure a substantially even application of pressure to protrusion 622, even if there are physical inconsistencies in the dimensions of the swaging tool or protrusion 622. In anvil swaging, pressure is applied to protrusion 622 by directly pressing a lip or die. Anvil swaging may utilize tools that are more durable and less expensive than those used in roller swaging. Ball staking and line staking are similar to anvil swaging, except they apply pressure to protrusion 622 in concentric local areas in embodiments where protrusion 622 comprises a semi-circumferential series of interrupted concentric grooves/holes.

Figure 10:
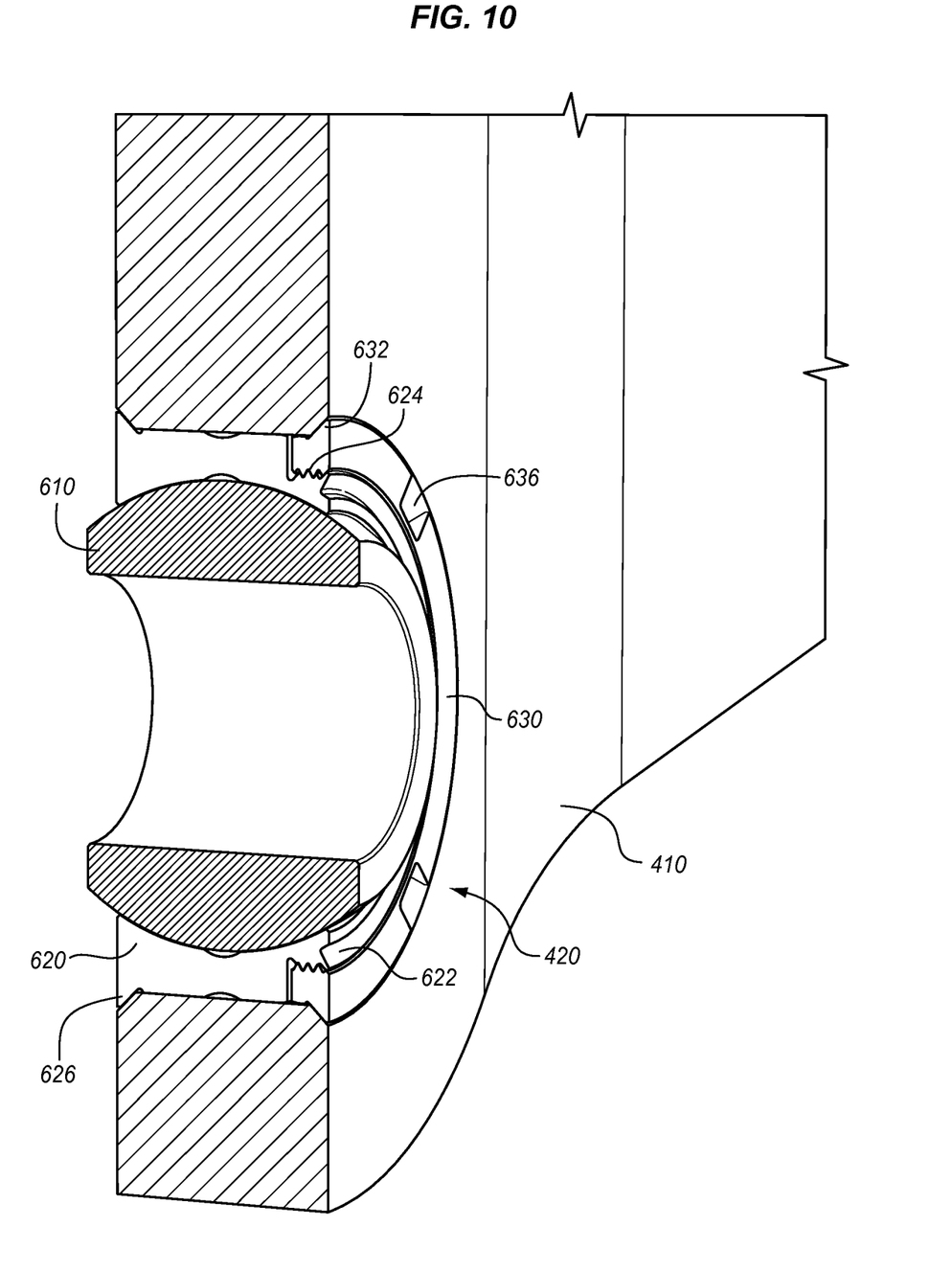
FIGS. 10-12 illustrate views of a bearing with a race that has been swaged to retain a retaining element in an exemplary embodiment.
Figure 11:
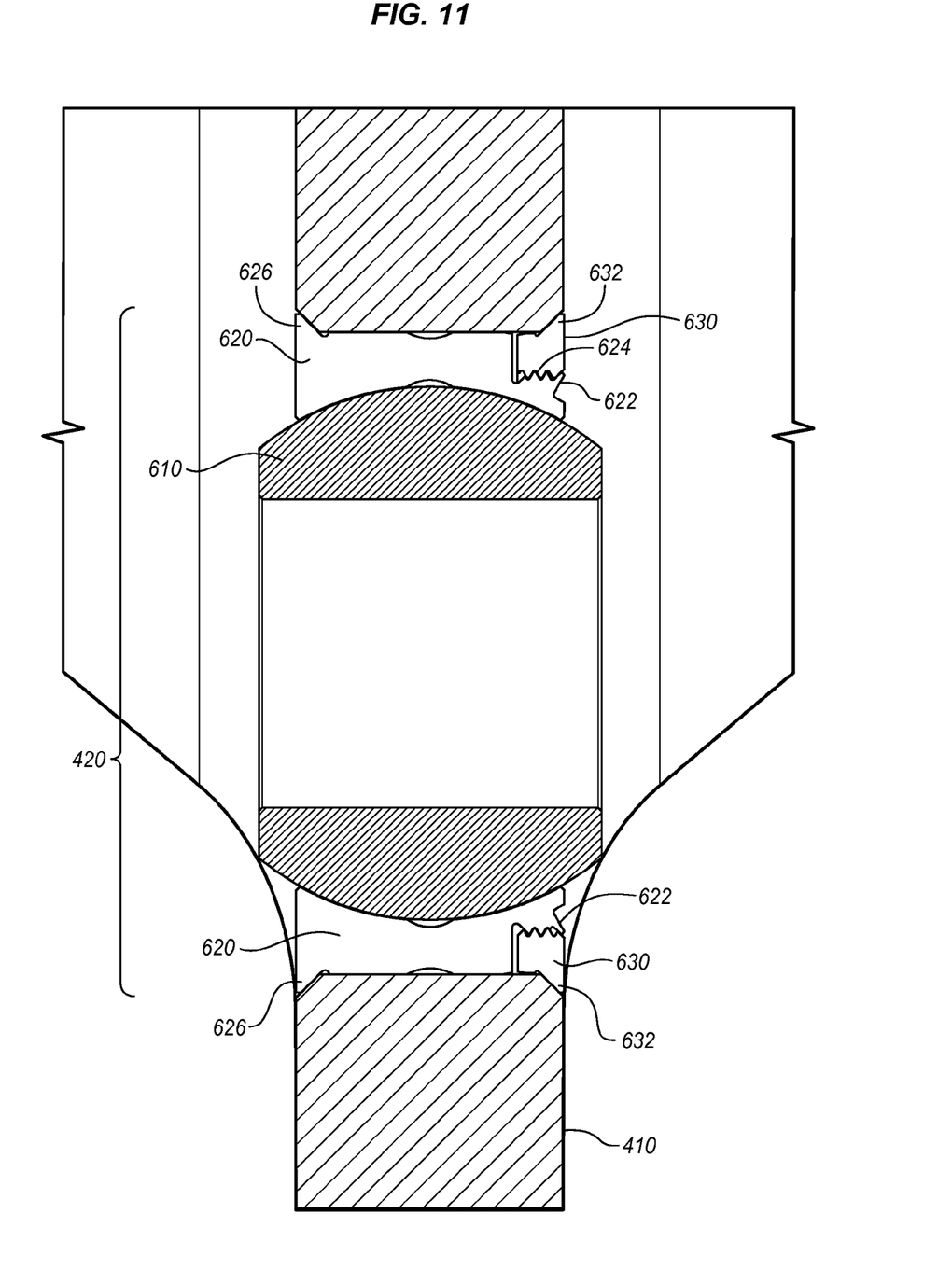
Figure 12:
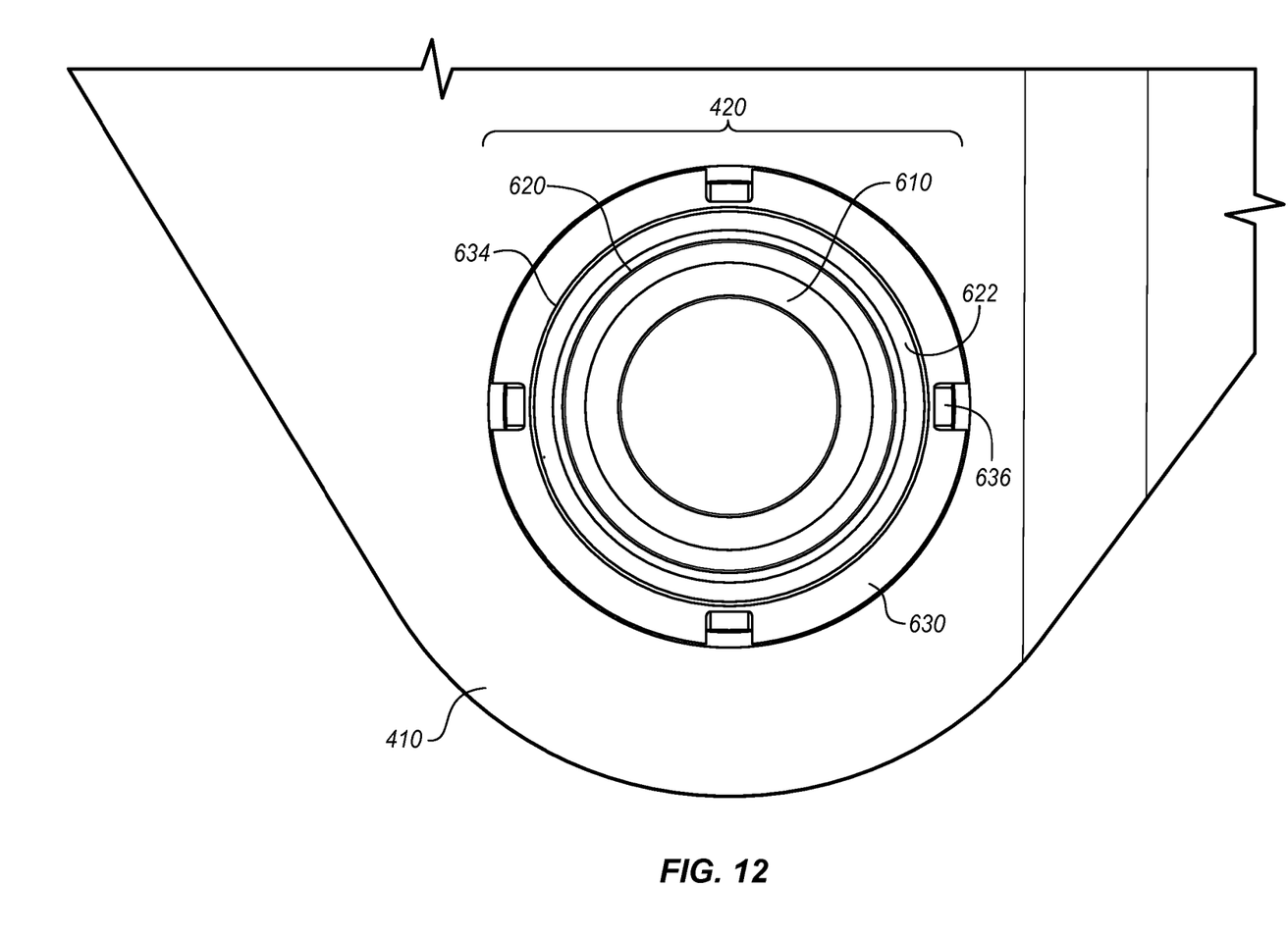

FIGS. 10-12 illustrate views of bearing 420 wherein race 620 has been swaged to retain a retainer nut 630 in an exemplary embodiment. Specifically, FIG. 10 illustrates a perspective cut-away view, while FIG. 11 illustrates a side cut-away view and FIG. 12 illustrates a front view. In FIGS. 10-12, annular protrusion 622 has been swaged onto circumferential feature 634 on retainer nut 630. Specifically, the outer diameter of annular protrusion 622 has been increased beyond a thread diameter (e.g., an outer or inner thread diameter) of annular threaded portion 624 (and therefore beyond a thread diameter of retainer nut 630). Thus, any attempt to unthread retainer nut 630 encounters substantial resistance. This means that the swaging process effectively locks retainer nut 630 in place, regardless of heavy load or vibration. Additionally, use of swaging ensures that mechanisms for holding retainer nut 630 in place are not overly bulky or heavy and use a reduced amount of design space, which imparts a benefit to the fuel economy of aircraft 100. Heavy items have a direct impact on fuel efficiency of aircraft 100, while bulky items may impact the overall aerodynamics of aircraft 100.

Illustrative details of the operation of bearing 420 will be discussed with regard to FIG. 13. Assume, for this embodiment, that bearing 420 is about to be installed into forward fitting assembly 210 of track 200 of aircraft 100.

Figure 13:
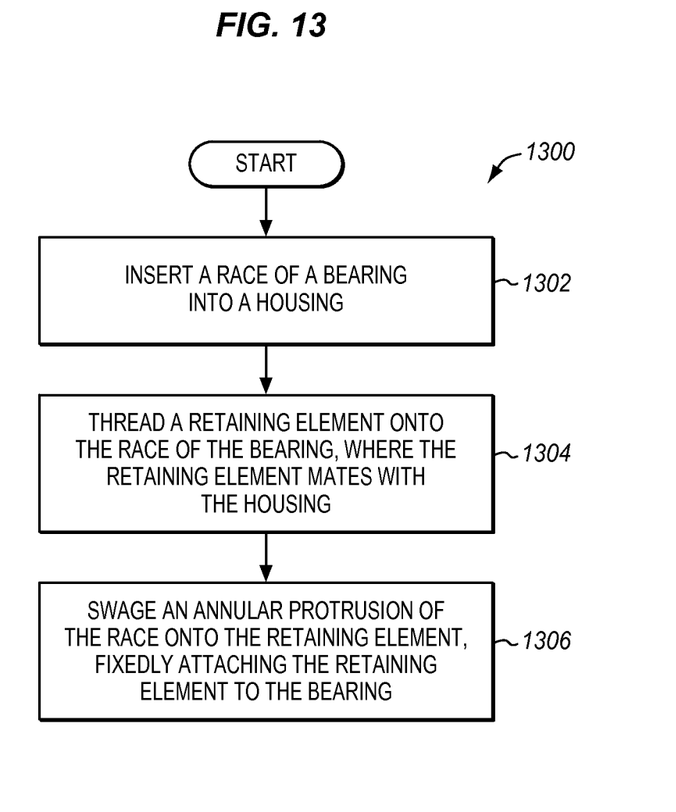
FIG. 13 is a flowchart illustrating a method for installing a bearing in an exemplary embodiment.

FIG. 13 is a flowchart illustrating a method 1300 for installing a bearing in an exemplary embodiment. The steps of method 1300 are described with reference to bearing 420 of FIG. 4, but those skilled in the art will appreciate that method 1300 may be performed for other bearings. The steps of the flowcharts described herein are not all inclusive and may include other steps not shown.

In step 1302, race 620 is inserted into housing 410. Since race 620 includes a mating feature 626 on one side, but not the other, race 620 may be slid or thrust from one direction into housing 410 (e.g., until mating feature 626 is seated or touching housing 410 and resists further forces).

In step 1304, retainer nut 630 is threaded onto annular threaded portion 624 of race 620. When fully threaded, locking feature 632 of retainer nut 630 mates with housing 410, meaning that bearing 420 resists axial loads to the left and right. Retainer nut 630 may, for example, be torqued into place according to a specific standard in order to ensure that bearing 420 is properly seated and retained.

In step 1306, annular protrusion 622 of race 620 is swaged over/onto retainer nut 630, which in turn ensures that retainer nut 630 will not migrate or loosen. This means that retainer nut 630 will continue to effectively restrain axial loads applied to bearing 420 over its operational lifetime.

Using swaging techniques in the manner described above, a bearing can be kept from migrating or rotating in an unexpected fashion. Fixedly attaching a retainer nut that is normally removable provides a substantial benefit in this case. Many bearings in aircraft cannot be visually inspected externally because the bearings are nested inside of other structures. Utilizing the swaging features described herein ensures that retainer nuts do not come loose between periodic inspections of those nested bearings. This is particularly important because it may take days of labor to access a retainer nut for a track. Thus, it is desirable to ensure that the retainer nut stays in position for a long period of time without requiring maintenance.

Although specific embodiments are described herein, the scope of the disclosure is not limited to those specific embodiments. The scope of the disclosure is defined by the following claims and any equivalents thereof.

The invention claimed is:

1. An apparatus comprising:
a bearing comprising:
an outer race having a first end and a second end, and wherein the race comprises:
a flange on the first end that is adapted to mate with a housing for the bearing;
an annular threaded portion on the second end, wherein the annular threaded portion is adapted to receive an annular threaded retaining element that mates with the housing; and
an annular protrusion on the second end, concentric with the threaded portion, that is adapted to be swaged, to thereby increase a diameter of the protrusion to overlap the threaded portion.

2. The apparatus of claim 1, wherein:
the annular protrusion is dimensioned to be swaged over an inner diameter of the retaining element to prevent the retaining element from unthreading from the outer race.

3. The apparatus of claim 1, wherein:
the annular protrusion is adapted to be swaged into a circumferential feature along an inner diameter of the retaining element.

4. The apparatus of claim 1, wherein:
the race retains a ball that defines a cylindrical cavity adapted to receive an axial rod.

5. The apparatus of claim 1, wherein:
the race is adapted to resist translating under axial load while the retaining element is threaded onto the race.

6. The apparatus of claim 1, wherein:
the annular protrusion comprises an outer wall of a V-groove on the race.

7. The apparatus of claim 1, wherein:
the bearing is adapted to be mounted into a flap track for an aircraft wing.

8. An apparatus comprising:
a bearing comprising:
an annular threaded retaining element mated with a housing for the bearing; and
an outer race having a first end and a second end, wherein the race comprises:
a flange on the first end that is mated with the housing for the bearing;
an annular threaded portion on the second end that has received the retaining element; and
an annular protrusion on the second end, concentric with the threaded portion, that is swaged, wherein a diameter of the protrusion overlaps the threaded portion.

9. The apparatus of claim 8, wherein:
the annular protrusion is swaged over an inner diameter of the retaining element to prevent the retaining element from unthreading from the race.

10. The apparatus of claim 8, wherein:
the annular protrusion is swaged into a circumferential feature along an inner diameter of the retaining element.

11. The apparatus of claim 8, wherein:
the race retains a ball that defines a cylindrical cavity adapted to receive an axial rod.

12. The apparatus of claim 8, wherein:
the race is resists translating under axial load while the retaining element is threaded onto the race.

13. The apparatus of claim 8, wherein:
the annular protrusion comprises an outer wall of a groove on the race.

14. The apparatus of claim 8, wherein:
the bearing is mounted into a flap track for an aircraft wing.

15. A method comprising:
inserting a bearing, comprising an outer race, into a housing;
threading a retaining element onto the race of the bearing, wherein the retaining element is adapted to mate with the housing; and
swaging an annular protrusion of the race onto the retaining element to fixedly attach the retaining element to the bearing.

16. The method of claim 15, further comprising:
swaging the annular protrusion over an inner diameter of the retaining element, to prevent the retaining element from unthreading from the race.

17. The method of claim 15, wherein:
the annular protrusion is swaged into a circumferential feature along an inner diameter of the retaining element.

18. The method of claim 15, wherein:
the race retains a ball that defines a cylindrical cavity adapted to receive an axial rod.

19. The method of claim 15, wherein:
the race is adapted to resist translating under axial load while the retaining element is threaded onto the race.

20. The method of claim 15, wherein:
the annular protrusion comprises an outer wall of a groove on the race.

* * * * *